United States Patent
Mason

(10) Patent No.: US 6,857,348 B1
(45) Date of Patent: Feb. 22, 2005

(54) ARRANGEMENT FOR CLAMPING A SAW BLADE

(75) Inventor: Neil Mason, Newton Aycliffe (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/461,265

(22) Filed: Dec. 15, 1999

(30) Foreign Application Priority Data

Dec. 18, 1998 (GB) .............................. 9827943

(51) Int. Cl.⁷ .............................................. B27B 11/06
(52) U.S. Cl. ........................ 83/699.31; 30/331; 30/338; 30/339
(58) Field of Search ...................... 30/339, 337, 277.4, 30/338, 331; 83/699.21, 699.31

(56) References Cited

U.S. PATENT DOCUMENTS

| | | | | |
|---|---|---|---|---|
| 1,266,832 A | * | 5/1918 | Lee ........................... 30/339 X |
| 2,282,902 A | | 5/1942 | Sultan ......................... 30/519 |
| 2,945,298 A | * | 7/1960 | Guttmann .................. 30/277.4 |
| 3,823,473 A | * | 7/1974 | Hoffman .................... 30/339 X |
| 3,901,117 A | | 8/1975 | Hoffman ....................... 83/835 |
| 4,173,071 A | * | 11/1979 | Ishida .......................... 30/339 |
| 4,771,542 A | * | 9/1988 | Beveridge ............... 30/277.4 X |
| 5,092,045 A | * | 3/1992 | Boyd, Jr. et al. ......... 30/331 X |
| 5,433,457 A | * | 7/1995 | Wright ..................... 30/337 X |
| 5,439,472 A | * | 8/1995 | Evans et al. .............. 30/339 X |
| RE35,258 E | * | 6/1996 | Palm ..................... 30/277.4 X |
| 5,722,168 A | * | 3/1998 | Huang ...................... 30/339 X |
| 5,903,983 A | * | 5/1999 | Jungmann et al. ... 30/699.21 X |
| 5,916,218 A | * | 6/1999 | Hagen et al. ............. 30/337 X |
| 5,930,902 A | * | 8/1999 | Hsu ......................... 30/337 X |
| 5,979,065 A | * | 11/1999 | Hsu ......................... 30/331 X |
| 6,105,260 A | * | 8/2000 | Parrish et al. ................. 30/331 |
| 6,138,364 A | * | 10/2000 | Schmitz ...................... 30/392 |
| 6,233,833 B1 | * | 5/2001 | Grant et al. ......... 83/699.21 X |

FOREIGN PATENT DOCUMENTS

| | | |
|---|---|---|
| BE | 440688 | 3/1941 |
| EP | 0072282 | 2/1983 |

* cited by examiner

*Primary Examiner*—Charles Goodman
(74) *Attorney, Agent, or Firm*—Harness, Dickey & Pierce, P.L.C.

(57) ABSTRACT

An arrangement for clamping a saw blade (12) includes a retaining member (6) on which a blade (12) for clamping can be mounted. The retaining member (6) is lockable in at least two positions such that each of the two positions clamps the blade (12) at a predetermined angle relative to a shaft (2) which drives the saw blade (12).

19 Claims, 11 Drawing Sheets

ARRANGEMENT FOR CLAMPING A SAW BLADE

BACKGROUND OF THE INVENTION

The present invention relates to an arrangement for clamping a saw blade and to a saw blade for use with the clamping arrangement and has particular, although not exclusive, relevance to such a clamping arrangement as used on a power jigsaw, or the like.

The ability to clamp the blade of a power saw has long been known to be a desirable feature. Power saws which cut using a linear reciprocal action usually operate at high stroke speeds, such as 3,000 strokes per minute.

Because of the large forces generated by the cutting action at these reciprocal frequencies, there is a need to rigidly clamp the blade to the shaft on which it is mounted and which is being driven by the motor of the power saw. Failure to clamp the blade could result in the blade working loose from its mounting and warping or snapping during use.

However, the desire to rigidly clamp the saw blade to its driving shaft tends to create problems with the need to change saw blades depending upon the nature of the workpiece being sawed. For example, a different type of saw blade is used to saw wood as opposed to metal. Thus the need to constantly change the saw blade is not helped by the need to rigidly mount the blade on its driving shaft.

It would therefore be desirable to utilise a mechanism which on the one hand allows rigid clamping of the saw blade to its driving shaft, and on the other hand allows rapid interchanging of different types of saw blade.

SUMMARY OF THE INVENTION

It is thus an object of the present invention to provide an arrangement for clamping a saw blade to a reciprocable shaft, the shaft including a retaining member on which a blade for clamping may be mounted; the retaining member being lockable in at least two positions, each of the at least two positions clamping the blade at a predetermined angle relative to the shaft. The provision of a lockable retaining member allows rapid interchange of different types of saw blade and also allows rigid clamping of the saw blade to the shaft.

Preferably the arrangement includes restraining means for restraining movement of the blade, in a direction perpendicular to the line of reciprocation of the shaft, when the blade is clamped. The restraining means aids with stability during use of the clamped blade.

Additionally or alternatively the restraining member may comprise a pin normally biased into a first position and which pin is moveable into a second position. Provision of a moveable pin allows for easy manual interchange of saw blades.

Advantageously the pin may carry a lug having a predetermined shape, which lug is arranged to co-operate with a correspondingly shaped recess. By arranging for the lug to have a shape which fits in a co-operable recess on the blade, a stable and rigid clamping of the blade may be achieved.

Preferably the pin may rotate about an axis such that when the lug is rotationally aligned with the recess, the biasing action causes the lug to fit within the recess thereby preventing further rotation of the pin about the axis. Additionally, when the lug is in the recess, the retaining member may be locked. Also the blade for clamping may be mounted on the lug.

In a preferred embodiment, the restraining means may comprise a plurality of arms depending from the shaft. Advantageously the plurality of arms may be arranged in pairs and a blade for clamping is positioned between a pair of the arms when clamped.

It is a further object of the present invention to provide a saw blade for use with the clamping arrangement defined above, the saw blade comprising a main body portion; a shank extending from the main body portion; and a mounting hole formed in the shank to enable operative coupling of the saw blade to the mounting arrangement, the saw blade characterised in that the mounting hole extends in two dimensions, the length of the extent in one dimension being greater than the length of the extent in the other dimension, and wherein the one dimension extends generally perpendicularly with respect to the other dimension. This arrangement allows for rigid clamping of the blade in use, or when attached to its mount.

Preferably the shank is integral with the body portion. This allows for reduced use of materials during manufacture and hence permits cost saving.

Additionally or alternatively the mounting hole is formed within the body of the saw blade and does not touch any peripheral surface of the saw blade. This permits a strong saw blade to be formed.

Advantageously the shape of the mounting hole may be rectangular, oval or elliptical. Also the length of extent may be greater for the dimension parallel with the line of action of the saw blade in use than for the dimension perpendicular with the direction of the line of action of the saw blade in use.

According to yet a further aspect of the present invention there is provided, in combination, a clamping arrangement and a saw blade as defined in the appendant claims.

BRIEF DESCRIPTION OF THE DRAWINGS

The present invention will now be described, by way of example only, and with reference to the accompanying drawings, of which.

DETAILED DESCRIPTION OF THE PREFERRED EMBODIMENT

Figure 1:
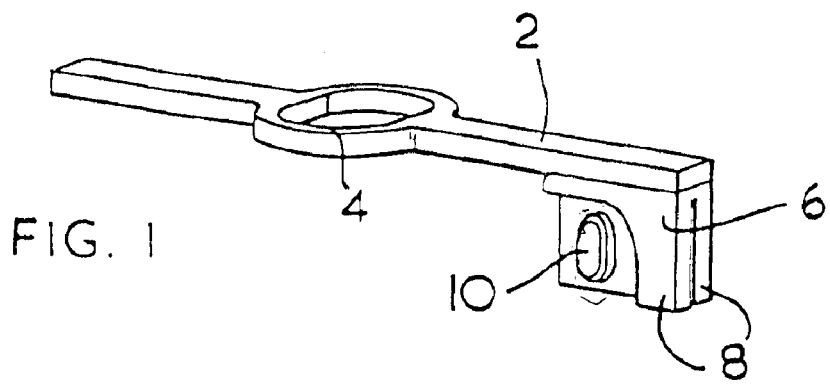
FIG. 1 shows a reciprocable shaft on which a saw blade may be mounted in accordance with an embodiment of the present invention.

Referring firstly to FIG. 1, there is shown a shaft (2) formed from pressed metal, such as steel, and having in the centre thereof a yoke (4). One end of the shaft (2) is formed integrally with a depending retaining member, here a blade mount (6). The blade mount (6) comprises a restraining means, here two arms (8) which depend from the shaft (2). The blade mount further includes a pin (10) which will be described in more detail below.

Figure 2:
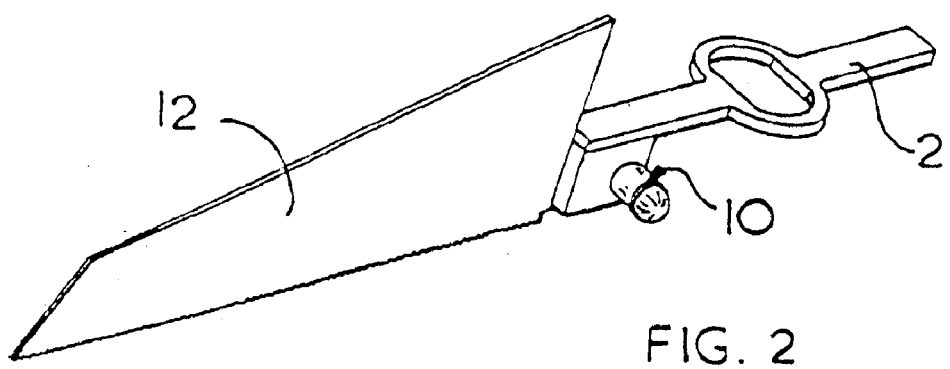
FIG. 2 shows the shaft of FIG. 1, but with a saw blade mounted thereon in an operating position from one side.
Figure 3:
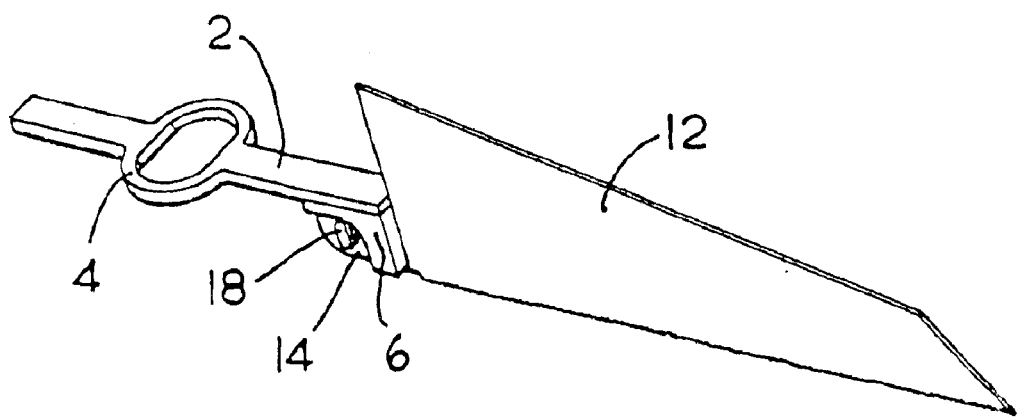
FIG. 3 shows the view of FIG. 2, but from the other side of the saw blade.

Referring now also to FIGS. 2 and 3, it can be seen that the shaft (2) is arranged to drive a saw blade (12) presented thereto and which is mounted on the blade mount (6). It can be seen that the saw blade (12) has a shank (14) which has formed therein a hole (16) (seen more clearly in FIGS. 5, 8 and 9) for mounting the blade (12) on a lug (18) of the pin (10). Although the saw blade (12) includes a shank in this, preferred, embodiment, the shank may be formed integrally with the body portion, as discussed below and with reference to FIG. 14(b).

Figure 4:
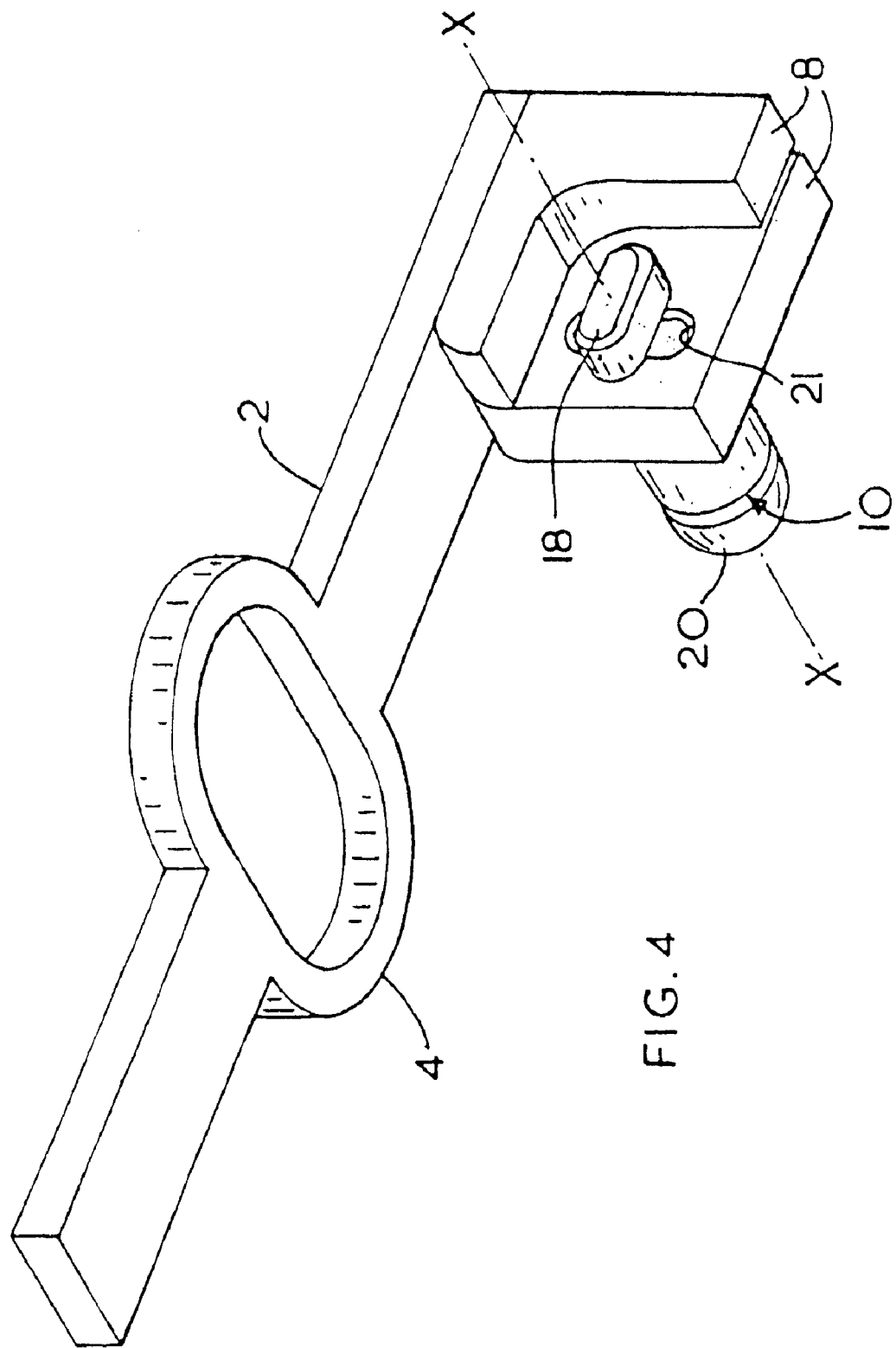
FIG. 4 shows a side view of the reciprocable shaft of FIG. 1, but with the retaining member thereof being in an unlocked position.

Referring now to FIG. 4, it can be seen that the pin (10) comprises a head (20) formed on one side of the blade mount (6) and a lug (18) cooperating with the head (20) formed on the other side of the blade mount (6). The shape of the lug (18) is the same as that of the hole (16) formed in the blade (12). This allows for the blade (12) to be mounted snugly on the lug (18).

The pin (10) is rotatable about its axis shown as X—X in FIG. 4 and it can be seen from this figure that the blade mount (6) has a recess (21) formed therein such that the lug (18) may sit within the recess (21) when it is in one of two positions. Because the pin (10) is rotatable about the axis X—X, then whenever the lug (18) is aligned with the recess (21) (in either of two positions 180° apart) then it will fit within the recess (21). In any other position, the lug (18) cannot sit within the recess (21).

In order for the lug (18) to be selectively aligned or not with the recess (21), the head (20) of the pin (10) is spring biased. In this manner, therefore, whenever the lug (18) is aligned with the recess (21) it "pops" into the recess and is held therein until the user exerts sufficient force against the head (20) against the action of the spring (described later below) to force the lug (18) out of the recess (21) and therefore allow the pin (10) to be rotated about the axis X—X.

Figure 5:
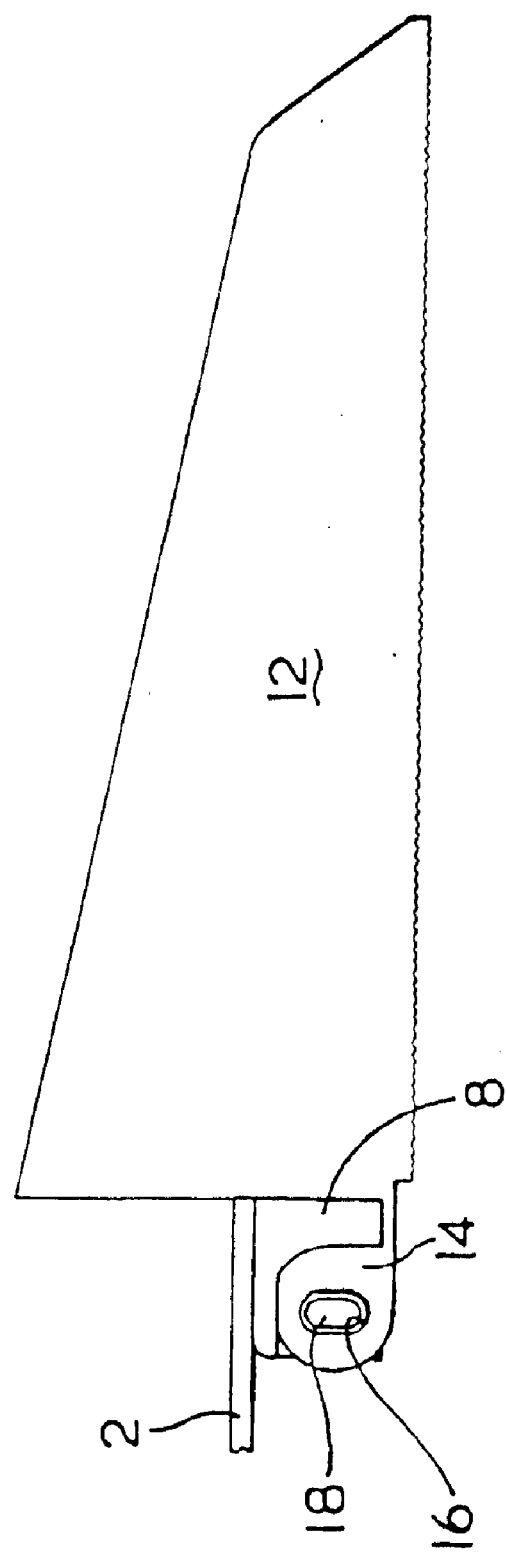
FIG. 5 shows the shaft of FIG. 1 with the saw blade mounted thereon in a locked position.

Referring now additionally to FIG. 5, it can be seen that the saw blade (12) is held in its locked position (because the lug (18) is within the recess (21)) against the shaft (2). Because the shaft (2) is arranged to reciprocate, that is drive the blade (12) backwards and forwards along a linear path, then it will be understood that each of the arms (8) is arranged to flank the shank (14) of the blade (12) to prevent the blade (12) from becoming detached from the blade mount (6). This is because the arms (8) prevent any movement of the blade (12) in a direction perpendicular to the direction of reciprocation of the shaft (2).

In order to understand the operation of the pin (10) and its interaction with the blade (12), reference will now be made in particular to FIGS. 5, 6 and 7.

Figure 6:
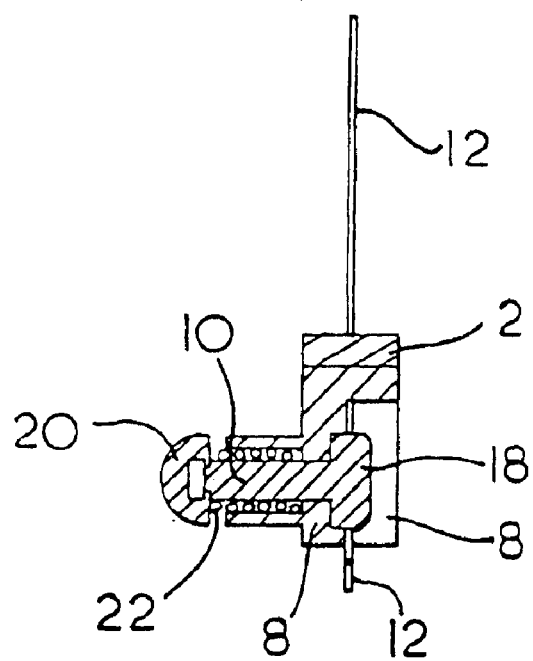
FIG. 6 shows a sectional view along the line A—A of FIG. 5.

The pin (10) is spring biased, and in the case of FIG. 6, it can be seen that the head (20) of the pin (10) has not been depressed and therefore under the action of the spring (22), the bead (20) is forced to the left of FIG. 6 therefore allowing the lug (18) to sit within the recess (21). This does, of course, presuppose that the lug (18) is aligned with the recess (21) as has been described here above. Assuming this to be the case, then the blade will be locked in this position. Rotation of the pin and therefore the lug (18) are not possible because the lug (18) is located within the housing (20).

Figure 7:
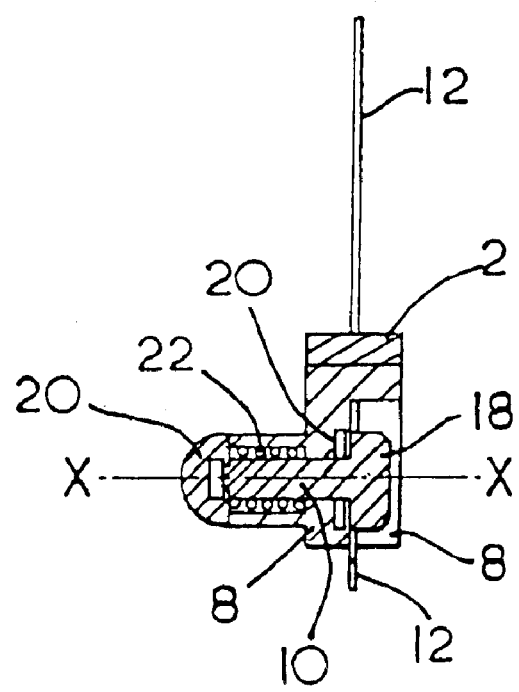
FIG. 7 shows a sectional view along the line B—B of FIG. 5.

Referring now to FIG. 7, it will be described how the lug (18) is released from the recess (21) in order to allow rotation of the saw blade (12).

Figure 8:
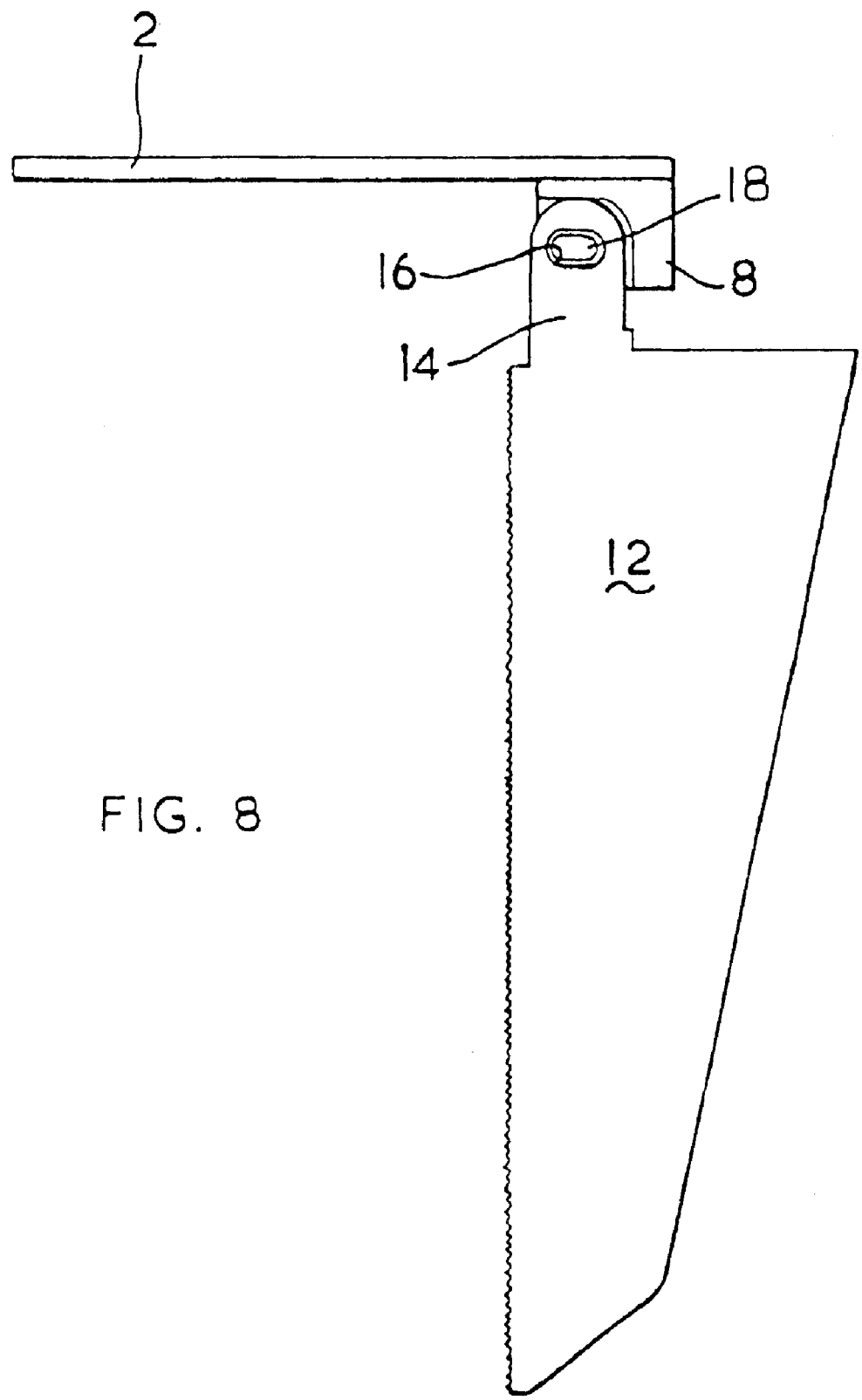
FIG. 8 shows a side view of a saw blade and the reciprocable shaft of FIGS. 2 and 3 in an unlocked position.

In FIG. 7 the user has pushed the head (20) to the right of the figure and therefore caused compression of the spring (22). The movement of the pin (10) to the right of the figure releases the lug (18) from the recess (21) and therefore allows rotation of the pin (10) about its axis X—X. Because the lug (18) is now no longer located within the recess (21) then rotation of the pin (10) means that the blade (12) may be rotated as well. Referring also to FIG. 8, this shows how the saw blade (12) has been rotated through 90° as compared with the locked position of FIG. 5.

Whilst referring to FIG. 8, it can be seen that, because the blade (12) is now perpendicular to the shaft (2) rather than parallel therewith as was the case in FIG. 5, then the shank (14) of the saw blade (12) is no longer constrained by the arms (8) of the blade mount (6). This means that the entire blade (12) may be removed from the lug (18) and could, for example, be replaced by an alternative saw blade.

Figure 9:
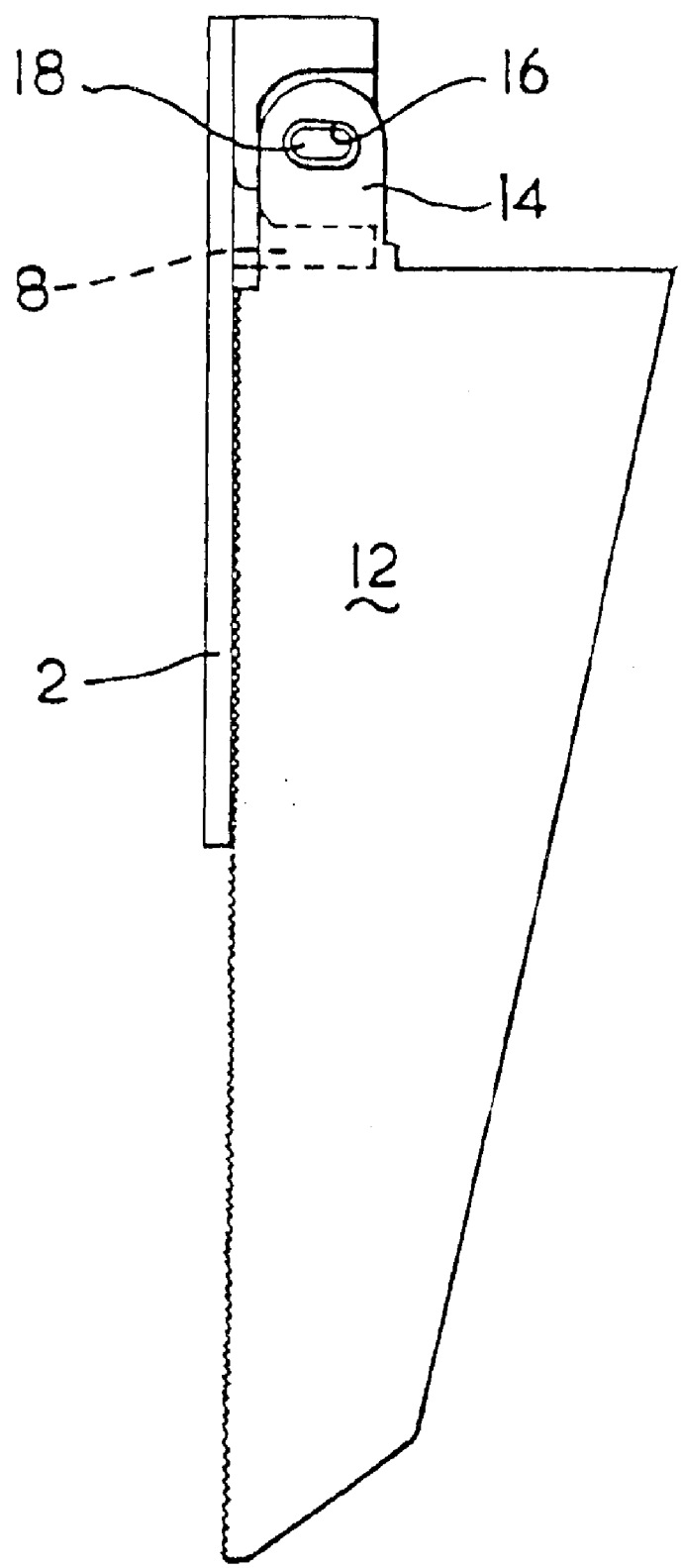
FIG. 9 shows the view of FIG. 8, but with the saw blade now retained in its stored and locked position.

Referring now to FIG. 9, it can be seen that further rotation of the pin (10) and the blade (12) is possible (because there is no alignment between the lug (18) and the recess (20)). The saw blade (12) as shown in FIG. 9 has now been rotated through 180° with respect to that of FIG. 5. It will be appreciated that the lug (18) is now realigned with the recess (21) and therefore if the user ceases to apply any force to the head (20) of the pin (10), then the lug (18) may fall back into the recess (21) and therefore lock the saw blade (12) in the position shown. This may be useful when the saw is to be carried around but the blade needs to be kept safely within the body of the saw, for example, to avoid damage to the saw blade.

Although only shown in dotted outline in FIG. 9, it will understood that a further pair of arms (8) may be employed in the blade mount (6) to retain the saw blade (12) in the position shown.

Figure 14A:
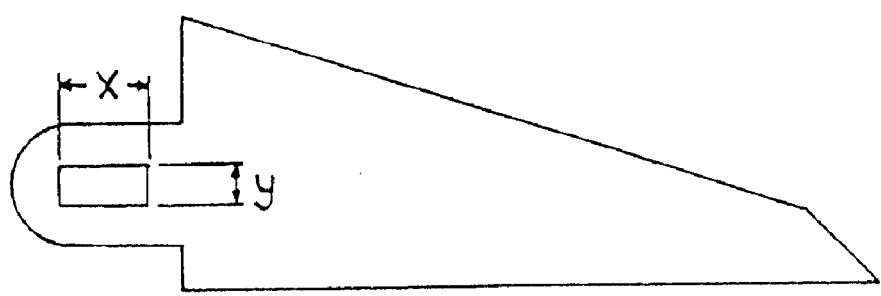
FIG. 14 illustrates schematically various hole configurations for a saw blade in accordance with an aspect of the present invention.

Referring now to FIGS. 14(a), (b) and (c), it can be seen that the mounting hole (16) extends in two, generally perpendicular directions. In the figures, these directions have been indicated by the axes marked "x" and "y". It can be seen that the length of extent of one of these axes, here "x", is greater than the length of extent of the other of these axes, here "y". This is permit rigid (that is non-moveable) mounting of the blade (12) on the lug (18).

It can be seen from these figures that it is preferable for the mounting hole (16) to be formed within the body of the saw blade (12) such that the-hole (16) does not touch any peripheral surface of the blade (12).

Figure 14B:
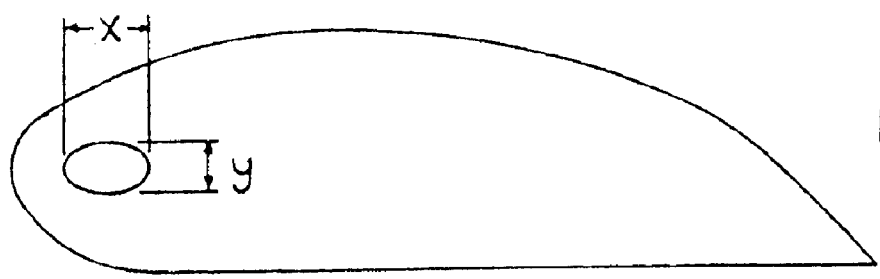
Figure 14C:
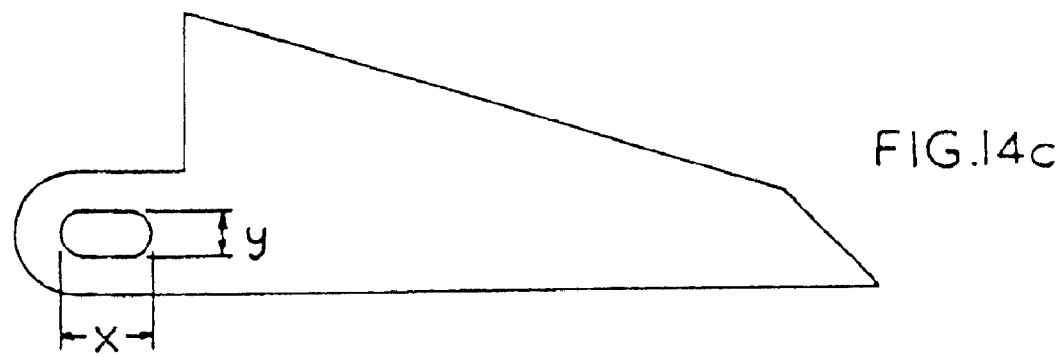

FIG. 14(a) illustrates the case where the hole (16) is formed as a rectangle; FIG. 14(b) that where the hole (16) is formed as an ellipse; and FIG. 14(c) that where the hole (16) is formed as an oval. These variants all share the common property of having a length (x) of extent in one dimension greater than that in another, orthogonal direction (y).

Figure 10:
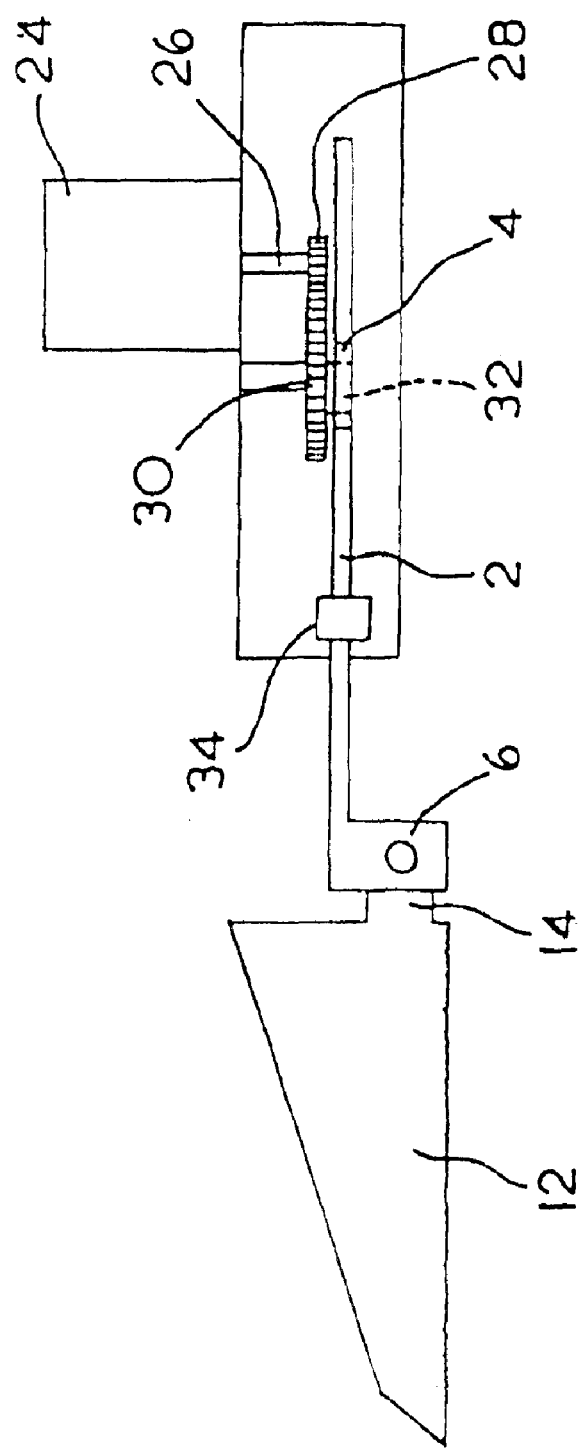
FIG. 10 shows a schematic illustration of the motor and internal mechanisms of a power tool in accordance with an embodiment of the present invention.
Figure 11:
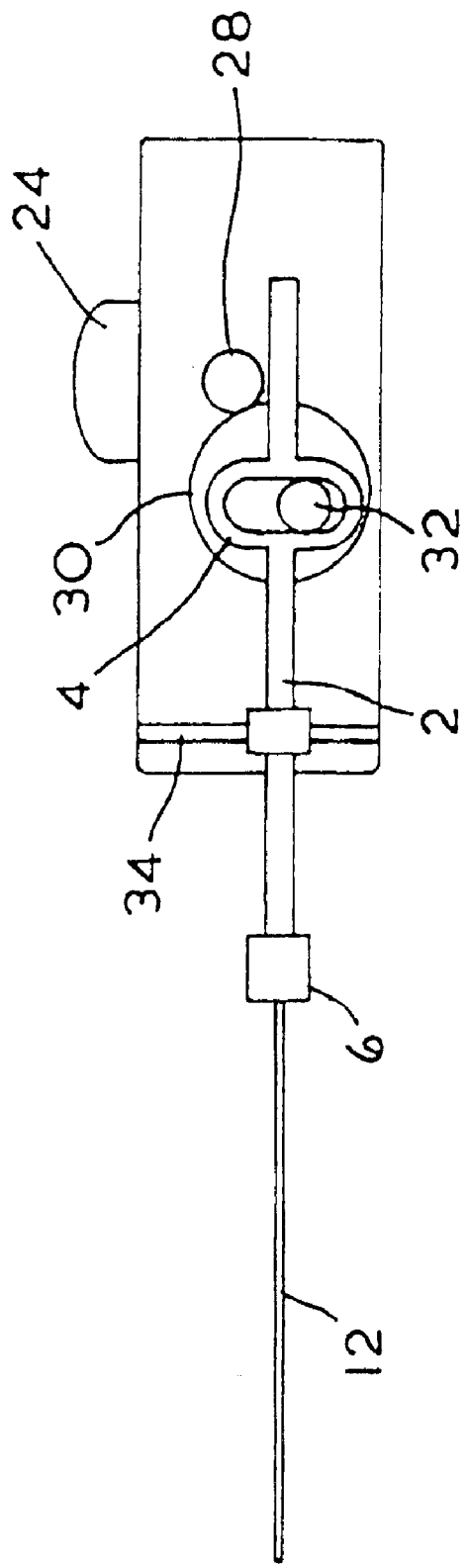
FIG. 11 shows a schematic side representation of FIG. 10.

Referring now to FIGS. 10 and 11 particularly, the internal mechanism of the power tool embodying the present invention will be described. In these examples, the power tool is a power saw.

An electric motor (24) is operable in conventional manner to drive a motor spindle (26) coupled to a drive wheel (28). The teeth of the drive wheel (28) mesh with the teeth of a gear wheel (30) having formed thereon an eccentric (32). Although not shown in the drawings, the eccentric (32) must be counter-balanced and those skilled in the art will appreciate this fact.

The eccentric (32) fits into the yoke (4). In this way, when the motor (24) is activated, it drives the drive wheel (28) which in turn causes rotation of the gear wheel (30). The circular movement of the eccentric (32) sitting in the yoke (4) therefore causes a linear reciprocal motion of the shaft (2) in a right-left-right motion as the drawings are viewed. In order to ensure that the only motion of the shaft (2) at the operative end (that is where the blade (12) and the blade mount (6) are situated) occurs, a retaining bar (34) having linear bearings surrounds the shaft (2). This restrains movement of the shaft only in the left-right-left linear direction.

Whilst in the above examples of FIGS. 10 and 11 only one drive wheel (28) is shown, those skilled in the art will appreciate that any desired gearing arrangement may be used. The choice of gearing arrangement will depend primarily on the step up/step down requirement between the rotational output speed of the motor (24) and the frequency of linear reciprocation needed for the shaft (2).

Figure 12:
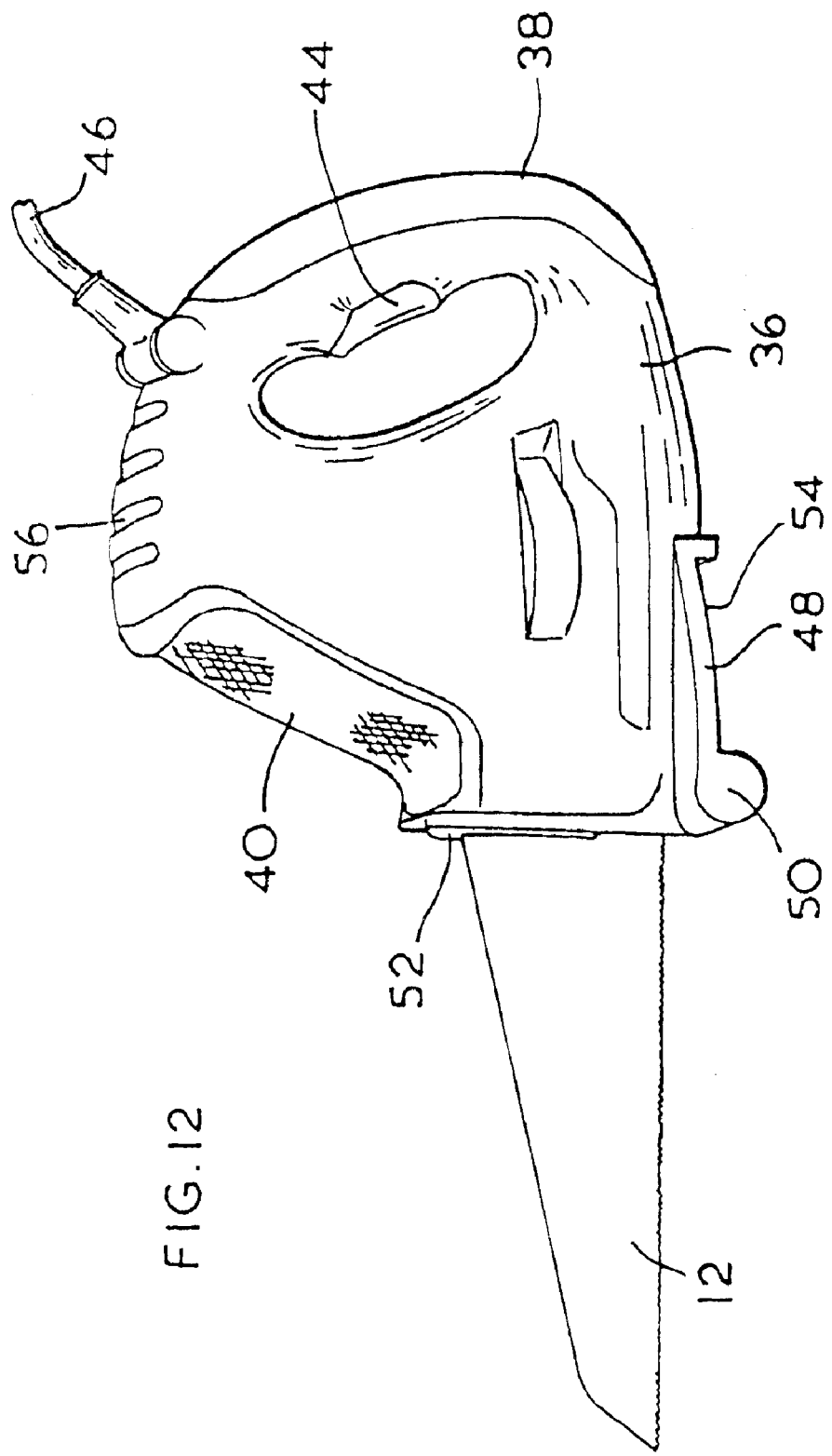
FIG. 12 shows a side view of a powered saw in accordance with an embodiment of the present invention.
Figure 13:
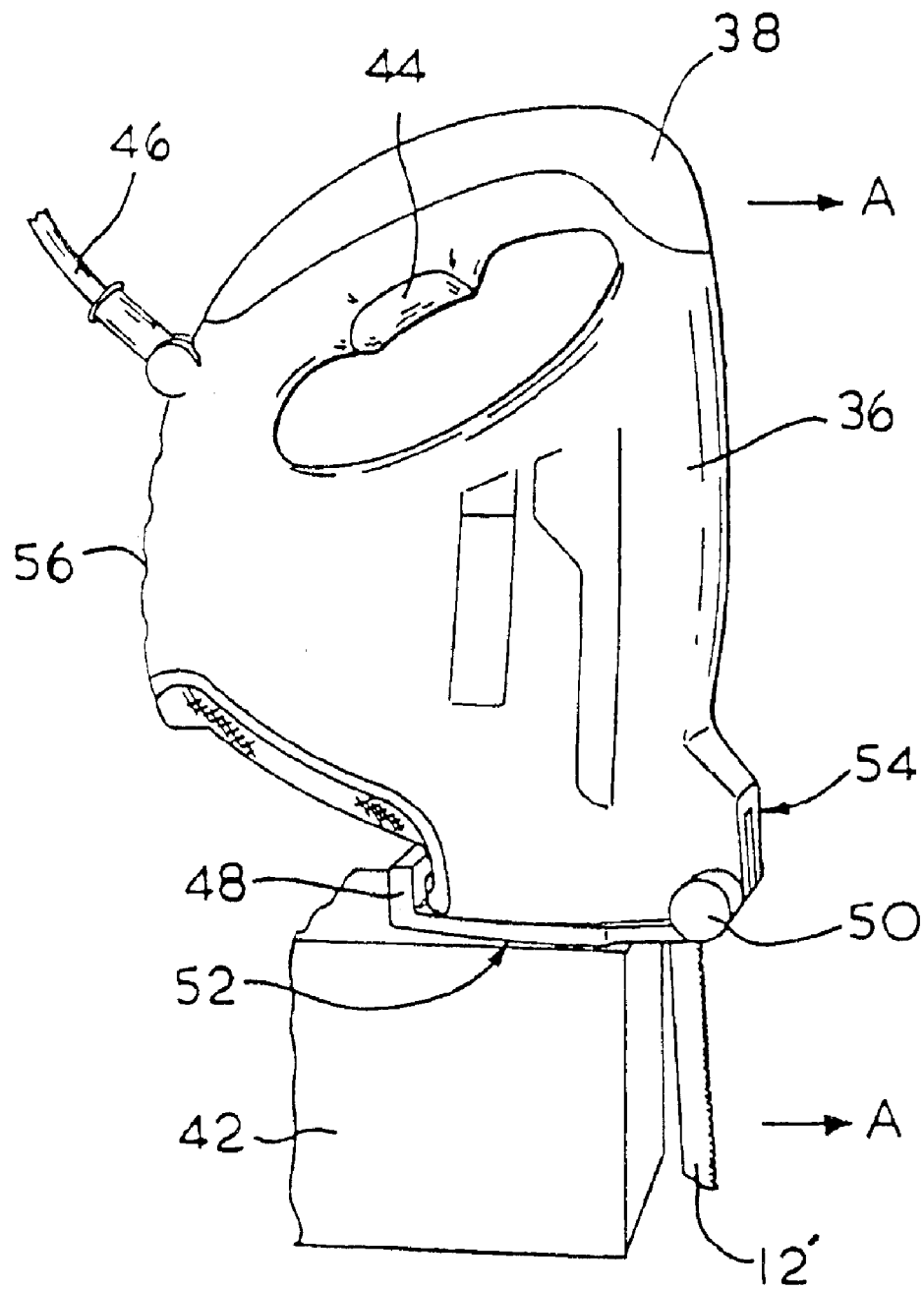
FIG. 13 shows a side view of an alternative use of a powered saw to that of FIG. 12.

Referring now particularly to FIGS. 12 and 13, two further embodiments of the present invention are now described. It can be seen by comparing these two figures, that the power tools shown therein share the same body (36). However, the tools shown in FIGS. 12 and 13 each are used for a different purpose and operate in different modes, as will be described here below. It should be understood that, for the purposes of FIGS. 12 and 13, the internal mechanism as shown in FIGS. 10 and 11 is incorporated therein. However, because FIGS. 12 and 13 show the tool from the outside, then the internal mechanisms cannot be seen.

In FIG. 12, the tool is used as a so-called panel saw. Panel saws are generally used for sawing large pieces of wood and the like in the form of blocks such as logs. In the present invention, it has been found desirable to be able to offer the user the facility of using the panel saw not only in its powered mode but also manually. That is, the user should be able to grip the handle (38) of the panel saw and use it as a conventional manually operated saw whether the blade is being driven by the motor (24) or not. To achieve this the saw needs to be lightweight but also it has been found that, when the saw is being driven by the motor (24), conventional reciprocating action will prevent manually using the tool with ease, because of the combination of the frequency of reciprocation of the saw blade (12) and the length of each reciprocal stroke.

Conventionally, it has been found that the frequency of reciprocation of the blade (12) has been around 3,000 strokes per minute. Additionally, the length of each reciprocal stroke has been in the region of 20 mm. The combination of this particular frequency and stroke length results in large vibrational forces being felt by the user. Additionally, this creates large interial forces which also need to be overcome in order to be able to use the saw manually. With a conventional panel saw, therefore, if the user wishes to use it manually rather than in its conventional powered mode, a degree of discomfort would be felt because the saw would be vibrating at a frequency which does not lend itself to holding the saw comfortably. Additionally, the amplitude of each reciprocal stroke of the blade (12) is so large that high inertial forces are felt by the user mean that to be able to pull and push the saw in a manual mode is not easily achievable.

It has been found that by reducing the length of each reciprocal stroke to preferably around 10 mm and concomitantly increasing the reciprocal stroke frequency to preferably around 6,500 strokes per minute, that this combination of lower stroke length and higher frequency results in less adverse vibrational and inertial forces being felt by the user. This then enables the panel saw of FIG. 12 to be used as a manual saw simply by holding the handle (38). Additionally, if the user requires a further grip on the body (36), a recess, formed as insert (40) is available for gripping by the other hand of the user (that is the hand which does not grip the handle (38)).

Although in the example described with reference to FIG. 12 the preferred frequency of oscillation has been given as 6,500 strokes per minute, the present invention has been found to operate effectively with a frequency of vibration between 3,000 and 10,000 strokes per minute. Similarly, although the preferred amplitude of each reciprocal stroke is given as 10 mm, it has been found that the present invention works effectively with a range of 5 to 15 mm.

Referring now also to FIG. 13, it can been seen that the same body (36) is used with a different saw blade (12'). Indeed, the saw blade (12') is that found on conventional "jigsaws". Jigsaws are tools which are used with relatively small saw blades and are used for cutting accurate shapes in a workpiece. Conventionally, jigsaws are held relative to the workpiece in a different attitude to panel saws. This can be seen by reference to the difference in attitude between FIGS. 12 and 13. In FIG. 13, the body (36) can be seen resting on a block (42) which represents a workpiece. In use of the jigsaw, the body (36) would be held on the block (42) in the attitude shown in FIG. 13.

It can be seen from FIG. 13 that the handle (38) is now positioned relative to the workpiece (42) such that the body (36) may easily be used as a jigsaw. In use of the jigsaw, a user exerts a force via the handle (38) in the direction of the large arrow marked "A". This is so that the blade (12') is driven also in the direction of the arrow "A" to cut through the workpiece.

It can be seen by comparing FIGS. 12 and 13, that the handle (38), although itself the same in both figures, it able to be used for exerting forces in a different direction depending on which mode of use (either the panel saw of FIG. 12 or the jigsaw of FIG. 13) the tools are put to.

The handle (38) is positioned adjacent a trigger (44) which trigger (44) is operable by user when the handle (38) is gripped.

It can be seen from both FIGS. 12 and 13, therefore, that the position of the handle (38) relative to the body (36) is such that the user may operate the saw in a plurality of positions relative to a workpiece. Thus, regardless of whether the tool is being used as a panel saw in FIG. 12 or a jigsaw in FIG. 13, the same handle is used for operating the saw. It will be appreciated by those skilled in the art, that this holds true whether the panel saw of FIG. 12 is being used as a powered saw by powering the motor (24) via an electricity supply cable (46), or whether it is being used manually.

In the examples shown, the trigger (44) is formed integrally with the handle (38). This need not necessarily be the case, and the trigger may be formed separately or indeed on another part of the body (36).

From FIGS. 12 and 13, therefore, it can be seen that the handle (38) is accessible from one of two sides, depending on whether the tool is to be used as a panel saw or a jigsaw.

It is envisaged that the present invention is of scope to allow more than two sides of the handle (38) to be used depending on the purpose to which the tool is being put.

It can be seen from FIGS. 12 and 13, that the body (36) also includes a pivotable sole plate (48). The sole plate (48) is pivotable about pivot point (50). The pivot point (50) includes a means (not shown) for allowing the sole plate (48) to be held at any one of a desired position around the range of possible pivotable positions about the point (50). In the example of FIG. 12, the sole plate (48) is tucked underneath the body (36). In the example of FIG. 13, the sole plate (48) is pivoted through 270° so as to act as the guide sole plate for a conventional jigsaw. In this mode, the blade (12) passes through the sole plate (48) when used in its jigsaw mode.

Those skilled in the art will appreciate that, conventionally, jigsaws use a sole plate (48) to act as a guide when cutting a workpiece. In the example of FIG. 13, although it cannot be seen from the drawing, the sole plate (48) includes visual indicia to allow the user to see exactly where the blade (12) will cut the workpiece when viewed from above the body (36).

It can be seen by comparing FIGS. 12 and 13, therefore, that the body (36) defines two working surfaces (52 and 54) dependent upon which mode the tool is being used. In the examples above, working surface (52) is used for the jigsaw mode of FIG. 13 and working surface (54) is used for the panel saw mode of FIG. 12. It will be understood by those skilled in the art that the sole plate (48) may be positioned at any suitable angle relevant to the body (36) dependent upon the use to which the tool is being put.

By referring now particularly to FIG. 13 it can be seen that, when the tool is used as a jigsaw, a user may also grip the dimpled surface (56) in order to assist with guiding the tool during use. Alternatively, this surface (56) can be used to form cooling vents within the body of the saw.

What is claimed is:

1. An arrangement for clamping a saw blade in a reciprocating power tool having a motor for receiving a reciprocating shaft comprising: a reciprocable power tool shaft, the power tool shaft having two ends, one end for coupling with the motor in the power tool and the other end including a retaining member on which a blade for damping may be mounted; the retaining member having a member for engaging the blade, said engaging member having a desired configuration such that upon rotation of said retaining member, said engaging member is rotated changing angular orientation of said engaging member, said engaging member rotates the blade changing the orientation of the blade in a plane of the blade, said retaining member lockable in at least two positions, each of the at least two positions clamping the blade at a predetermined angle relative to the shaft.

2. An arrangement according to claim 1, further including restraining means for restraining movement of the blade, in a direction perpendicular to a line of reciprocation of the shaft, when the blade is clamped.

3. An arrangement according to claim 1, wherein the retaining member comprises a pin normally biased into a first position and which pin is moveable into a second position.

4. An arrangement according to claim 3, wherein the pin carries a lug having a predetermined shape, which lug is arranged to cooperate with a correspondingly shaped recess.

5. An arrangement according to claim 4, wherein the pin may rotate about an axis such that when the lug is rotationally aligned with the recess, the biasing action causes the lug to fit within the recess thereby preventing further rotation of the pin about the axis.

6. An arrangement according to claim 5 wherein, when the lug is within the recess, the retaining member is locked.

7. An arrangement according to claim 4, wherein said blade for clamping is mounted on the lug.

8. An arrangement according to claim 2, wherein the restraining means comprises a plurality of arms depending from the shaft.

9. An arrangement according to claim 8, wherein the plurality of arms are arranged in pairs and said blade for clamping is positioned between said pair of arms when clamped.

10. An arrangement according to claim 1 wherein the saw blade further comprising:
a main body portion; a shank extending from the main body portion; and a mounting hole formed in the shank to enable operative coupling of the saw blade to the retaining member,
the saw blade mounting hole extends in two dimensions, a length of extent in one dimension being greater than a length of the extent in the other dimension, and wherein the one dimension extends generally perpendicularly with respect to the other dimension.

11. An arrangement according to claim 10, wherein the snank is integral with the body portion.

12. An arrangement according to claim 10, wherein the mounting hole is formed within the body of the saw blade and does not touch any peripheral surface of the saw blade.

13. An arrangement according to claim 10, wherein the mounting hole is rectangular, oval or elliptical in shape.

14. An arrangement according to claim 10, wherein the length of extent is greater for the dimension parallel with a line of action of the saw blade in use than for a dimension perpendicular with the line of action of the saw blade in use.

15. A reciprocating saw comprising a housing, a motor contained in said housing and a reciprocating shaft driven by said motor, said shaft including a blade mount, said blade mount further comprising:
a first wall having a recess formed therein;
a pin disposed through said first wall at a location of said recess and having a lug formed on one end thereof, said lug having a shape corresponding to that of said recess, said pin biased with said lug received in said recess with respect to said first wall, said pin movable against said bias to move said lug out of said recess with respect to said first wall, said pin secured against rotation while said lug is received in said recess and said pin rotatable when said lug is moved out of said recess with respect to said first wall;
and a second wall disposed adjacent to and spaced from said first wall.

16. The saw recited in claim 15 further comprising a saw blade having shank with a hole formed therein, said hole corresponding in shape to the shape of said lug, wherein said blade may be mounted on said blade mount by moving said lug out of said recess, placing said hole over said lug, and rotating said blade such that said walls flank said shank.

17. The saw recited in claim 16, said lug being blocked against being received in said recess in at least one position of rotation of said pin, said second wall not extending adjacent said first wall at the location of said pin.

18. The saw recited in claim 17, wherein said shape is non-circular.

19. The saw recited in claim 18, wherein said shape is oval.

* * * * *